Patented Mar. 23, 1948

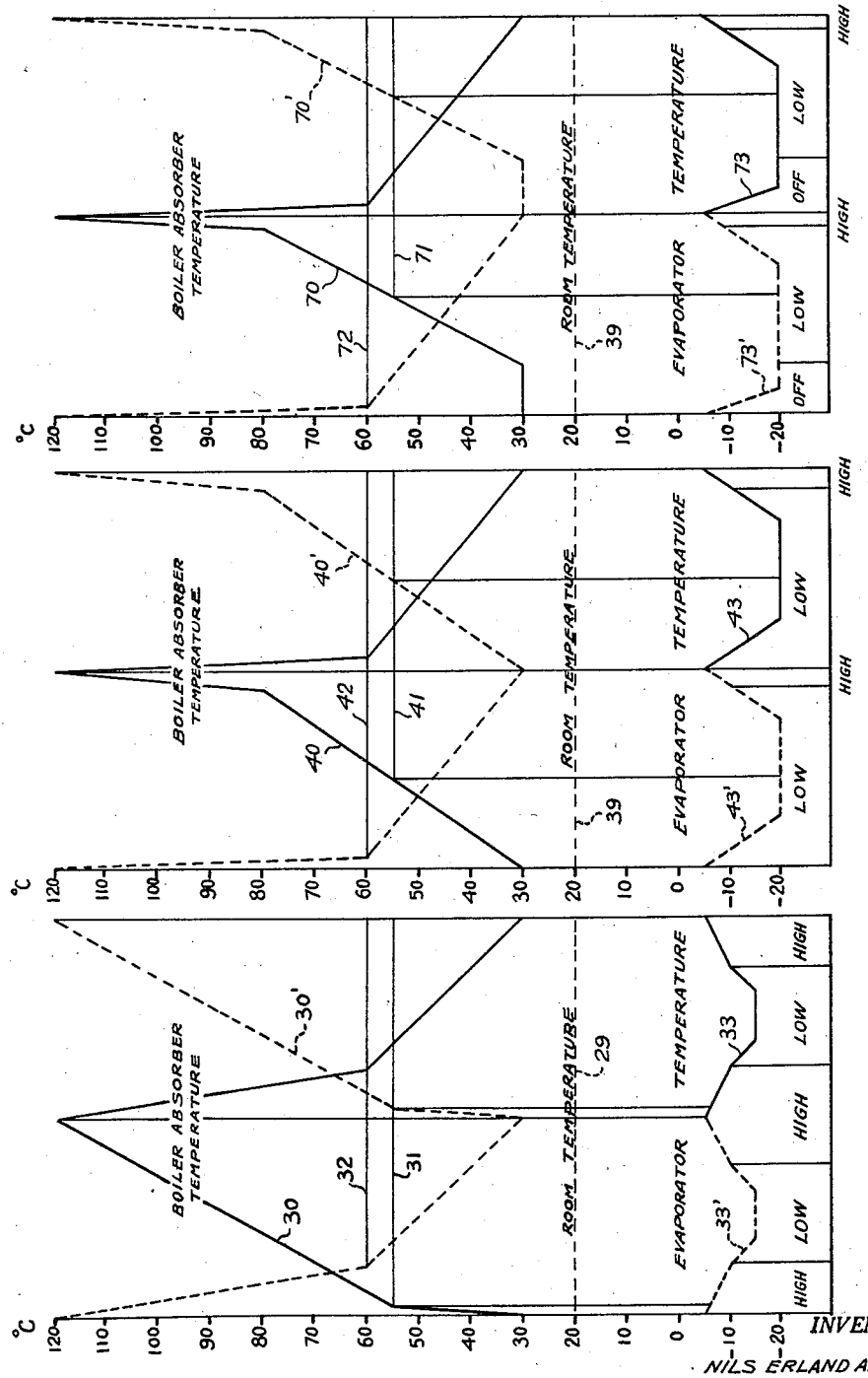

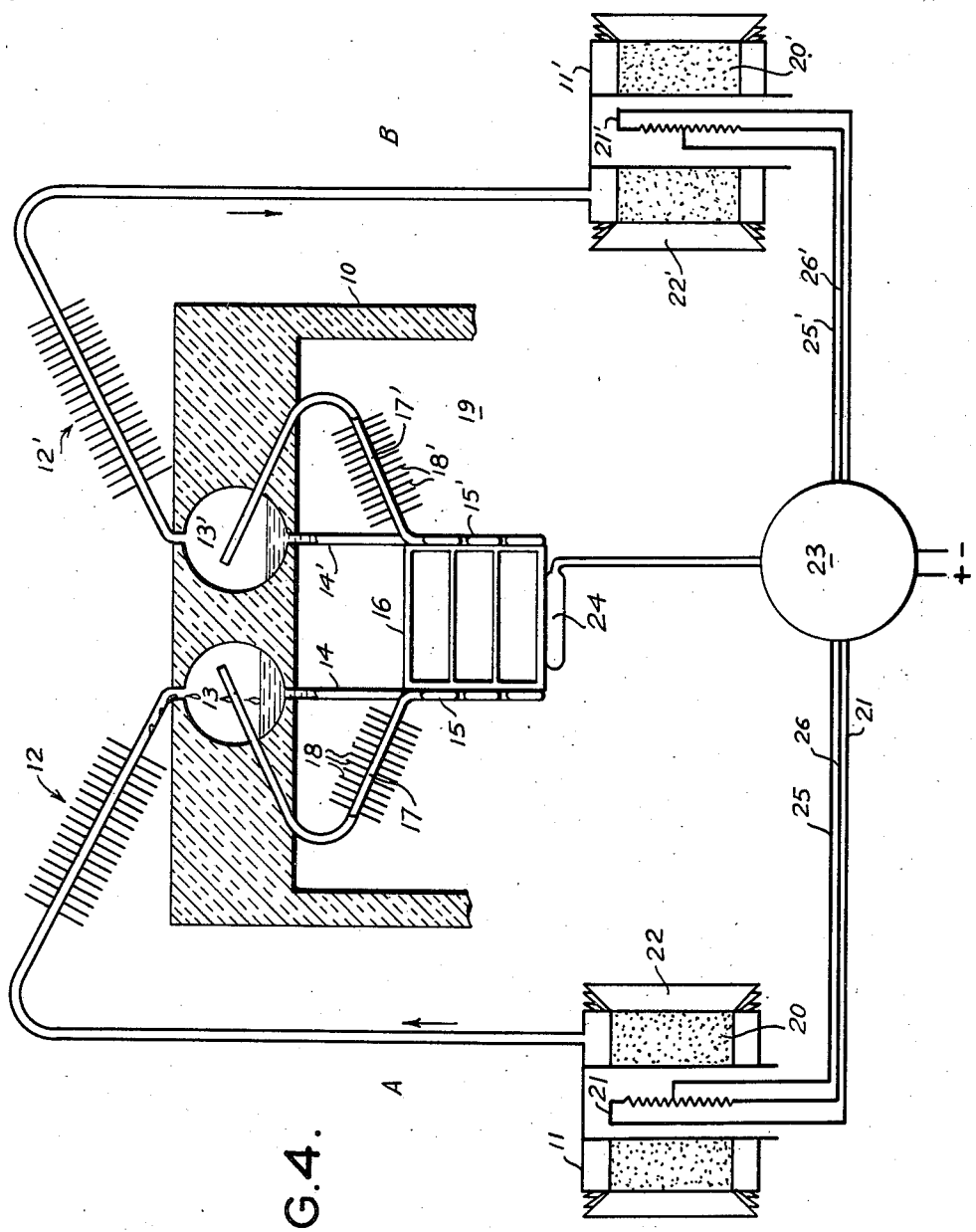

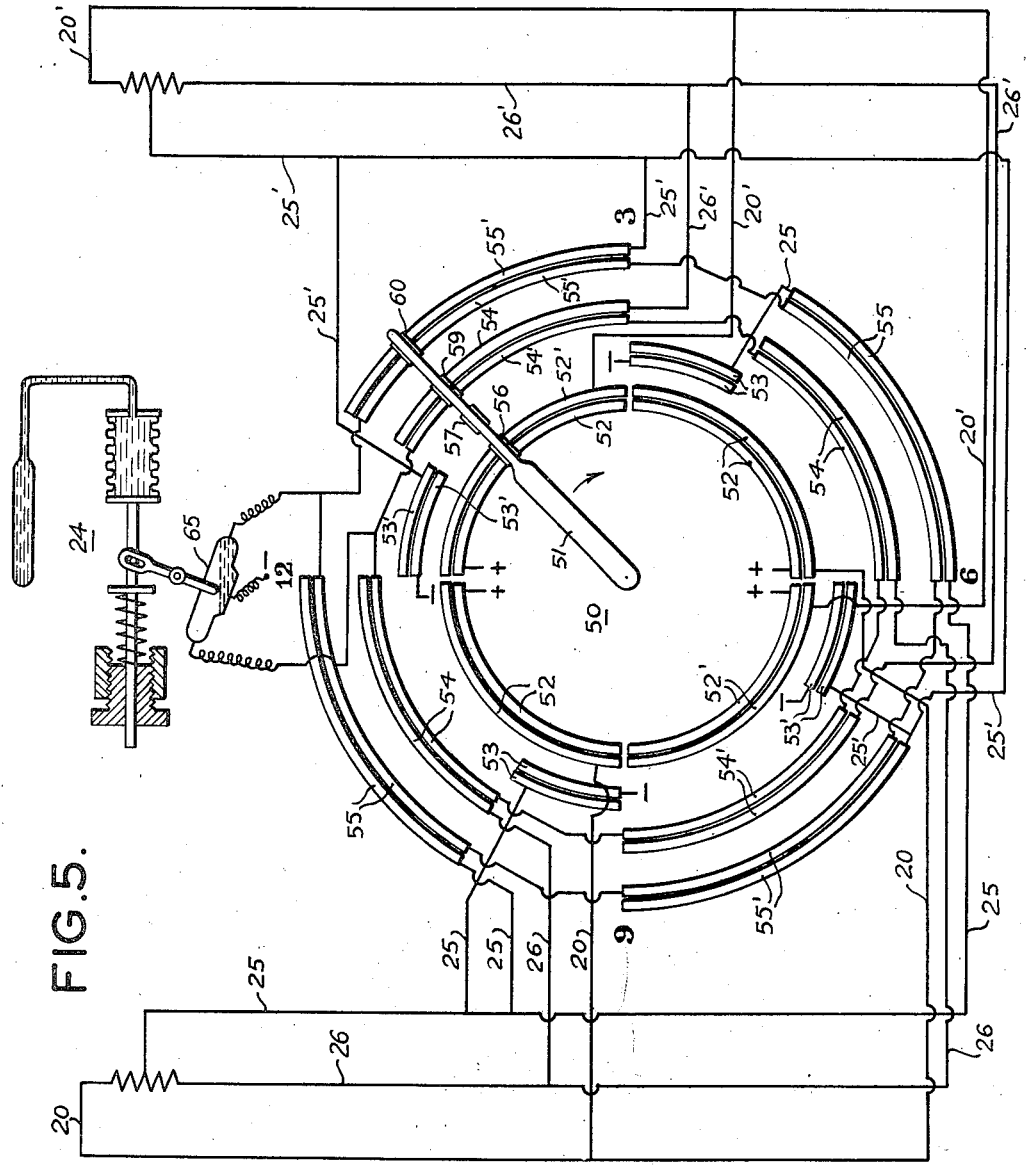

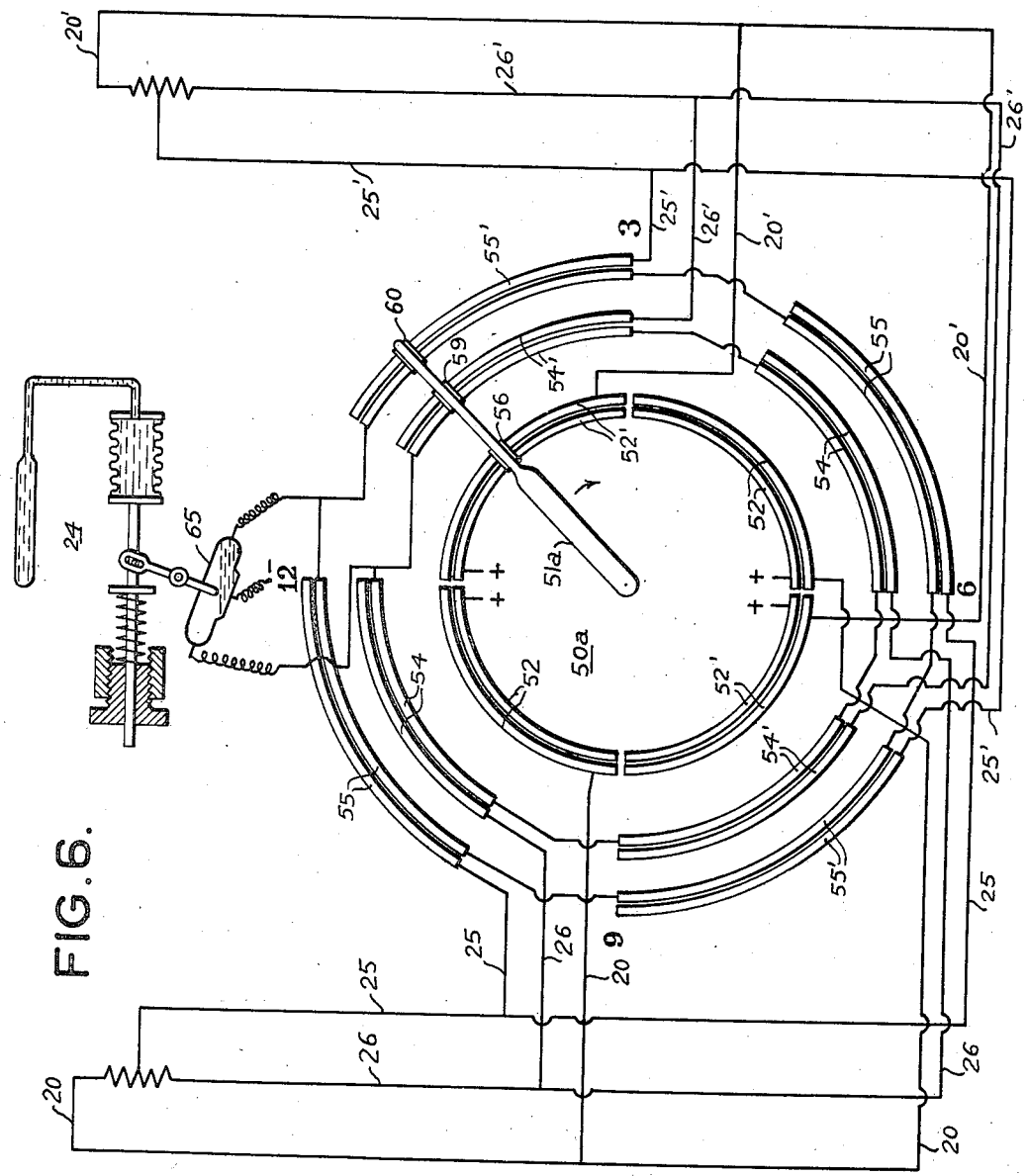

UNITED STATES PATENT OFFICE 2,438,105

REFRIGERATING APPARATUS OF THE INTERMITTENT ABSORPTION OR ADSORPTION TYPE

Nils Erland af Kleen, Stockholm, Sweden, assignor to Kleen Refrigerator, Inc., Hoboken, N. J., a corporation of Delaware Application September 14, 1942, Serial No. 458,240

1 Claim. (Cl. 62—5)

This invention relates to new and useful improvements in refrigerating apparatus of the intermittent absorption or adsorption type in which two or more units operate in out of phase relation to one another for the provision of substantially continuous refrigeration. For convenience the invention will be described in connection with absorption type refrigerating apparatus, but it is to be understood that the use of the expressions "absorb," "absorbent," etc., in the following description and appended claim is intended to include the corresponding expressions "adsorb," "adsorbent," etc. applicable to refrigerating apparatus of the adsorption type.

It is known that by cooling down the boiler-absorber or generator-absorber of an intermittent absorption system, a certain evaporator temperature will be reached under certain conditions. If this cooling down is done in a more rapid manner so that more heat is removed from the boiler-absorber at the beginning of the absorbing period, the evaporator temperature will drop to a lower point. It is also known that after the evaporator temperature has reached its lowest point, the taking away of heat from the boiler-absorber is very much less than in the beginning.

For example with strontium chloride as the absorbent and ammonia as the refrigerant, the main point to which the boiler-absorber should be cooled as soon as possible after the switch-over from generating to absorbing is about 60° C., and to reach this temperature the boiler-absorber can either be water-cooled, or air-cooled, either directly or indirectly. With direct or indirect air-cooling it is not possible within the limited space afforded in a household refrigerator cabinet to construct and install the heat dissipating surfaces to give the same advantage that prevails with water-cooling. Furthermore, when two intermittent units are synchronized in one way or another to operate in out of phase relationship, there occurs another disadvantage, especially when such units are thermostatically controlled as to the heat input. Generally, the rate of heat that is supplied to the boiler-absorber of each unit is controlled either by the cabinet temperature or the evaporating temperature or both in such a manner that with a rising temperature, the rate of heat is increased to shorten the cycles, that is, to drive out the necessary amount of refrigerant in the shortest possible time.

Up to the present time, the thermostat controls responsive to the evaporator and/or cabinet temperature have been set to certain temperatures to increase the rate of heat to a higher value until the evaporator and/or cabinet temperature is restored to the predetermined level. Consequently, with two or more units working in out of phase relationship, the high rate of heat will stay on even after the heat has been switched over from one unit to the other and will heat up the boiler-absorber of the generating unit faster than necessary. This means that the refrigerant will be driven out or liberated at an earlier stage than is desired and will impair not only the coefficient of performance of the apparatus but also the possibility of reaching a low evaporator temperature.

In other words, with two intermittent absorption refrigerating units working in out of phase relationship, a high rate of heat supplied to the boiler-absorber of a respective unit at the beginning of the heating or generating period thereof will cause refrigerant vapors to be liberated from the absorbent and to be condensed in the condenser too soon following the switch-over from generating to absorbing of the other unit so that warm refrigerant liquid will be delivered to the evaporator at a time when the evaporator temperature of the absorbing unit is being lowered. Consequently, the evaporator temperature of the absorbing unit will not be lowered as quickly nor will as low an evaporator temperature be attained as would otherwise be the case if no excess heat in the form of warm refrigerant were supplied to the evaporator at this time.

Therefore, it is the primary object of the invention to overcome the above noted disadvantages in the operation of two intermittent absorption refrigerating units in out of phase relationship and to this end the invention consists in delaying the application of heat or in controlling the rate of heat supplied to the boiler-absorber of a respective unit following the switch-over from generating to absorbing of the other unit so as to prevent generation of the refrigerant vapor in the first-named unit until the second-named unit has attained a low or its lowest evaporator temperature. In this manner, as no excess heat is supplied to the evaporator at the beginning of the absorbing period of the respective unit, not only will there be provided a lower evaporator temperature but such temperature will be attained more quickly than has heretofore been possible.

With the above and other objects in view which will appear as the description proceeds, my invention resides in the novel features hereinafter more fully set forth in the following description, illustrated by way of example in the accompanying drawings and more particularly pointed out in the appended claim.

Referring to the drawings in which numerals of like character designate similar parts throughout the several views:

Fig. 1 is a time-temperature chart of the operating condition of refrigerating apparatus of the intermittent absorption type having two units working in out of phase relationship, in which the rate of heat input to each unit is thermostatically regulated in accordance with the evaporator temperature and the high rate of heat stays on after the switch-over from one unit to the other;

Fig. 2 is a similar chart showing one method of carrying out the invention by supplying heat at a low rate at the beginning of the generating periods to delay the heating-up of the boiler-absorbers;

Fig. 3 is a similar time-temperature chart showing another method of carrying out the invention by having a period during which no heat is supplied immediately following the switch-over from one unit to the other;

Fig. 4 is a diagrammatic view of refrigerating apparatus of the intermittent absorption type having two air-cooled units operating in out of phase relation to each other and in which the rate of heat input to the boiler-absorbers is regulated in accordance with the evaporator temperature;

Fig. 5 is a detail view of one form of control for operation of the refrigerating apparatus of Fig. 4 in accordance with the invention as shown in the chart of Fig. 2, and Fig. 6 is a similar view of a modified form of control for operation of the refrigerating apparatus of Fig. 4 in accordance with the invention as shown in the chart of Fig. 3.

In the drawings, referring first to Fig. 4, a portion of a household refrigerator cabinet 10 is shown cooled by refrigerating apparatus of the intermittent absorption type in which two units generally indicated as A and B, respectively, operate in out of phase relation to each other to provide substantially continuous refrigeration. Inasmuch as the two units are similar in all respects to one another, only the various parts of unit A will be described in detail by reference characters, the corresponding parts of unit B being distinguished in the drawings by the prime of such reference characters.

Each unit consists of a closed circuit formed by a plurality of interconnected elements including a boiler-absorber or generator-absorber 11, an air-cooled condenser 12, a liquid refrigerant receiving vessel 13, and an evaporator 14, the latter having a cooling portion 15 in thermal contact with the heat conducting walls of an ice-tray compartment 16 in the upper portion of the cabinet 10 and having a separate cooling portion 17 provided with fins 18 for cooling the air in the food storage space 19 of the cabinet. The absorption units illustrated are of the dry or solid absorbent type and each boiler-absorber contains suitable absorbent material 20, such for example as strontium chloride (SrCl₂), capable of absorbing a gaseous refrigerant such as ammonia (NH₃) during the absorbing periods of the unit and of giving up such refrigerant during the generating periods. Heat is supplied to the boiler-absorber during the generating periods by any suitable means such as the electrical heating element 21, shown as an example. During this period, refrigerant vapors are liberated from the absorbent material 20 under influence of the heat supplied by the heater 21 and such vapors pass to the condenser 12 where they are liquefied under cooling action of the cooling air and the refrigerant liquid is collected in the vessel 13 and evaporator 14. Following this period of operation of the unit, the heat supply is shut off and the boiler-absorber is cooled by any suitable means during the absorbing period of the unit. For this purpose, I have shown the boiler-absorber provided with a plurality of fins 22 forming heat dissipating surfaces adapted to be cooled directly by air although any other suitable cooling means well known to those skilled in the art may be employed.

During this cooling or absorbing period, refrigerant liquid evaporates in the evaporator part or cooling portion 15 in heat exchange relation with the ice-tray compartment 16 to cool the latter and also evaporates in the evaporator part or cooling portion 17 to cool the air in the storage space 19 passing in heat exchange relation thereto and the refrigerant vapor is reabsorbed by the absorbent material 20 in the boiler-absorber.

The operation of each unit from generating to absorbing and vice versa is controlled by any known mechanism generally indicated as 23 operating to switch over the heat from one unit to the other and vice versa at predetermined time intervals. A thermostat bulb 24 shown responsive to the evaporator temperature but which may be responsive to the cabinet temperature operates to regulate the heat input between a predetermined minimum or low and a predetermined maximum or high through the medium of any well known switch device (not shown in Fig. 4) which completes the circuit to the heating elements 20, 20' either through current-carrying line 25, 25' to supply heat at a low rate of input or through current-carrying line 26, 26' to supply heat at a high rate of input.

The disadvantage in the operation of the refrigerating apparatus just described in which the rate of heat input is thermostatically regulated but with no provision made to delay the heating-up of each boiler-absorber at the beginning of the generating period of the respective unit are graphically depicted in Fig. 1 for a room temperature of 20° C., for example, indicated by broken line 29 and where the evaporator thermostate 24 operates to increase the heat from "low" to "high" at −10° C. The boiler-absorber operating temperature of unit A is represented by solid line 30 from which it will be observed that during the generating periods, when the boiler-absorber is heated to drive out the refrigerant, the temperature, as measured at the outside shell of the boiler-absorber, rises from a predetermined minimum (30° C.) to a predetermined maximum (120° C.) when all of the refrigerant that can be utilized for refrigeration has been driven out and that during the absorbing periods, when the boiler-absorber is cooled for re-absorption of the refrigerant, the temperature drops from the predetermined maximum to the predetermined minimum. The corresponding boiler-absorber operating temperature of unit B is represented by the broken line 30'. The temperature to which the boiler-absorber is heated during the generating period of the respective unit before the refrigerant starts to be liberated is designated as 55° C. and is represented by horizontal line 31 while the temperature to which the boiler-absorber must be cooled as quickly as possible at the beginning of the absorbing period of the respective unit is designated as 60° C. and is represented by horizontal line 32. During the absorbing period of unit B, the evaporator temperature will follow broken line 33' and during the absorbing period of unit A, the corresponding evaporator temperature will follow solid line 33.

As clearly shown in the chart, at the beginning of the absorbing period of each unit, the evaporator temperature goes down to a predetermined minimum, and thereafter gradually rises from the predetermined minimum to the predetermined maximum at the end of the absorbing period so that the evaporator thermostat 24 will operate to increase the head to "high" during the rise in temperature to drive out the refrigerant from the boiler-absorber of the generating unit in the shortest possible time following which the control mechanism 23 operates to switch over the heat from the generating unit to the other unit operating in out of phase relation thereto. However, as the evaporator thermostat 24 will maintain the "high" heat after the switchover until the evaporator temperature drops to —10° C., the boiler-absorber of the generating unit will be heated up so rapidly that refrigerant will be driven out of the boiler-absorber of the generating unit and will flow as relatively warm liquid refrigerant to the evaporating system of the generating unit before the evaporator temperature has dropped to —10° C. when the heat is decreased to "low." Consequently, the coefficient of performance of the refrigerating apparatus is impaired inasmuch as excess heat is supplied to the evaporator in the form of relatively warm liquid refrigerant at a time when the evaporator temperature is going down. Moreover, as this excess heat is taken up by the absorbing unit, it will take longer for the evaporating system of the absorbing unit to attain its lowest evaporator temperature.

I have found that the coefficient of performance of refrigerating apparatus of this type can be materially increased and a lower evaporator temperature attained either by supplying "low" heat immediately following the switch-over as shown in Fig. 2, or by shutting off the heat supply immediately following the switch-over as shown in Fig. 3 until the absorbing unit has attained a low evaporator temperature. In either event, no refrigerant will be delivered to the evaporating system until the absorbing unit has attained a low or its lowest temperature.

In Fig. 2 inasmuch as "low" heat is supplied to the boiler-absorber of the generating unit immediately following the switch-over, the boiler-absorber temperature rise will be relatively slow as indicated by solid line 40 for unit A and broken line 40' for unit B, so that before the boiler-absorber is heated to 55° C. and indicated by horizontal line 41 when the refrigerant starts to be liberated from the absorbent, the absorbing unit will have reached its lowest evaporator temperature. Moreover, inasmuch as no excess heat is supplied to the evaporating system of the absorbing unit at a time when the evaporator temperature is going down, its boiler-absorber can be cooled to the critical point of 60° C., represented by the horizontal line 42, more rapidly than was possible in Fig. 1 with the same cooling means, thus providing a lower evaporator temperature, as represented by solid line 43 for unit A and by broken line 43' for unit B, for operating conditions similar to those prevailing for the Fig. 1 operation and at the same room temperature of 20° C. as designated by broken line 39.

As soon as the evaporator temperature rises above —10° C., the evaporator thermostat will increase the heat to "high" to drive out the refrigerant from the generating unit in the shortest possible time following which the heat is switched over from one unit to the other and "low" heat again supplied to the other unit to complete the cycle. It will be observed that as the "low" heat is supplied for a longer period than in the Fig. 1 operation, the "high" heat may be increased to a greater value than in Fig. 1 without danger of impairing the evaporator temperature inasmuch as the period during which the "high" heat is supplied the evaporator temperature is rising when it is desired to drive out the refrigerant from the generating unit as quickly as possible. Thus, by increasing the value of the "high" heat, the period during which such "high" heat is supplied can be correspondingly reduced.

Many different mechanisms may be employed to control the operation of the refrigerating apparatus in accordance with the invention, such mechanisms being either manually operated, thermostatically operated or operated by a clock. In Fig. 5 I have shown as an example a clock-operated mechanism generally indicated as 50 including a movable switch arm 51 adapted to make and break the circuit to the heating elements 20 and 20', respectively, as it travels over the face of the clock. In the form of control shown, the heat is switched over from one unit to the other every three hours and for this purpose a separate set of stationary contacts in the form of arcuate segments is provided on the face of the clock mechanism 50 for each heating element, dividing the clock mechanism into quadrants, the first and third of which quadrants each include four separate pairs of arcuate segments 52', 53', 54' and 55', respectively, radially spaced from one another and adapted to control the circuit to the heating element 20'. Similarly, the second and fourth quadrants of the clock mechanism each include four pairs of arcuate segments, 52, 53, 54 and 55, respectively, also radially spaced from one another and adapted to control the circuit to the heating element 20.

Each pair of segments 52 and 52' is substantially coextensive with its respective quadrant and is adapted to be engaged by contact 56 carried by the movable arm 51 to connect the heating elements 20 and 20', respectively, with the positive source of current. Each pair of segments 53 and 53' extends over a relatively short distance from the beginning of its respective quadrant and is adapted to be engaged by a contact 57 on the movable arm 51 to connect the heating elements 20 and 20', respectively, with the negative source of current through lines 25 and 25', respectively, to complete the circuit for supplying "low" heat from the beginning of the generating period to the point at which refrigerant starts to be liberated from the boiler-absorber, or during the time the evaporating system of the absorbing unit is dropping to a low or to its lowest evaporator temperature. Each pair of segments 54 and 54' extends for a predetermined distance in its respective quadrant from the end of the corresponding segments 53 and 53' to the end of the quadrant and is adapted to be engaged by a contact 59 on the arm 51 to connect the heating elements 20 and 20', respectively, with the negative source of current through lines 26 and 26', respectively, to complete the circuit for the supply of "high" heat. Segments 55 and 55' are co-extensive with the corresponding segments 54 and 54' and each is also adapted to be engaged by a contact 60 on the arm 51 to connect the heating elements 20 and 20', respectively, with the negative source of current through lines 25 and 25', respectively, to complete the circuit for the supply of "low" heat.

The circuit through the segments 54, 54' for "high" heat or through the segments 55 and 55' for the "low" heat is selectively controlled by a thermostat device generally indicated as 24 and including a mercury switch 65 adapted to be tilted from one circuit-making position to another and vice versa in response to the evaporator temperature.

Thus, as the arm 51 moves over the face of the clock mechanism 50 through the first quadrant, its contact 56 will engage segments 52' and its contact 57 will engage segments 53' to complete the circuit to the heating element 20' for the supply of "low" heat. As the arm continues to move through the quadrant, its contact 57 will reach the end of the arc defined by the segments 53 and its contact 59 will engage segments 54' and its contact 60 will engage segments 55'. During this period of movement of the arm 51 across the segments 54' and 55', the evaporator thermostat 64 will determine whether the circuit to the heating 20' will be completed through the "high" heat line 26' or through the "low" heat line 25'.

During its travel through the second quadrant, the arm 51 will operate to complete the circuit to the heating element 20 by engagement of its contacts 56, 57, 59 and 60 with the associated segments 52, 53, 54 and 55 as just described in connection with heating element 20'.

Where no heat is to be supplied immediately following the switch-over as shown in Fig. 3 until the evaporator temperature indicated by solid line 73 for unit A and by broken line 73' for unit B, has reached the lowest point, the control mechanism of Fig. 5 may be modified as shown in Fig. 6 in which only three pairs of segments 52, 54 and 55 are provided on the face of the clock 50a for heating element 20 and three corresponding pairs of segments 52', 54' and 55', provided for heating element 20', the movable switch arm 51a carrying only three contacts 56, 59 and 60 for engagement with the respective segments 52, 54 and 55 or 52', 54' and 55'.

Thus, as the switch arm 51a moves through the first part of each quadrant, the circuit to the corresponding heating element will not be completed until the contacts 59 and 60 engage segments 54 and 55, respectively, for heating element 20, or 54' and 55' for heating element 20' and since at this moment the evaporating system of the absorbing unit has reached its lowest point, the switch 65 of the evaporator thermostat 24 will complete the circuit through the "low" heat line 25 or 25'. The temperature rise in the respective boiler-absorbers, as indicated by solid line 70 for unit A and by broken line 70' for unit B, will therefore be relatively slow and the point at which refrigerant starts to be liberated, as indicated by horizontal line 71 will not be reached until the evaporating system of the absorbing unit has taken up practically all of the heat that it can from the surrounding parts, that is, the ice-freezing compartment and the food storage space of the cabinet. Consequently, the filling up of the evaporating system of the generating unit with relatively warm liquid refrigerant will not in any way interfere with the low evaporator temperature of the absorbing unit even though "high" heat might be supplied at this time to speed up the liberation of the refrigerant in the generating unit. Moreover, as no heat is supplied to the refrigerating apparatus immediately following the switch-over, the boiler-absorber of the absorbing unit can be cooled down to the critical temperature of 60° C., as indicated by line 72, even more quickly than could be done where "low" heat was supplied so that theoretically, an even lower evaporator temperature can be reached.

It will thus be seen that by delaying the heating-up of the boiler-absorbers of two or more intermittent absorption units operating in out of phase relation to one another a higher coefficient of performance is obtained and a lower evaporator temperature attained than by operating such units in accordance with previous methods. While the total heat that is used per cycle is the same as that previously used, the value of the "high" heat is greater in the present invention than the "high" heat used in previous methods but the period during which such "high" heat is supplied is less than heretofore.

From the foregoing it is believed that the advantages of the invention will be readily understood by those skilled in the art without further description, it being borne in mind that numerous changes may be made in the details disclosed without departing from the scope of the following claim.

What I claim is:

Refrigerating apparatus including two intermittent absorption refrigerating units having alternate heating and cooling periods, heating means for each of said units to effect generation of refrigerant vapor, means for varying the heating rate of said heating means in accordance with the demands for refrigeration to vary correspondingly the rate of generation of refrigerant vapor per unit of time, and mechanism for controlling the operation of said heating means to heat each of said units intermittently and in out of phase relationship with respect to one another including means constructed and arranged to terminate operation of the heating means of a respective unit at the end of the heating period thereof and simultaneously initiate operation of the heating means of the other unit but at a rate insufficient to effect generation of refrigerant vapor for a predetermined period at the beginning of the cooling period of the first-named unit.

NILS ERLAND AF KLEEN.

REFERENCES CITED

The following references are of record in the file of this patent:

UNITED STATES PATENTS

| Number | Name | Date |
| --- | --- | --- |
| 1,506,531 | Kasley | Aug. 26, 1924 |
| 1,774,820 | Williams | Sept. 2, 1930 |
| 1,886,339 | Kettering | Nov. 1, 1932 |
| 1,897,980 | Hulse | Feb. 14, 1933 |
| 2,021,994 | Hainsworth | Nov. 26, 1935 |
| 2,039,588 | Forsberg | May 5, 1936 |
| 2,087,939 | Sarnmark | July 27, 1937 |

FOREIGN PATENTS

| Number | Country | Date |
| --- | --- | --- |
| 116,374 | Australia | June 26, 1941 |

OTHER REFERENCES

German publication—Haushalt - Kaltemashin und Kleinggewerbliche, by Plank and Kuprianoff.